United States Patent
Kumar

(10) Patent No.: US 9,189,025 B2
(45) Date of Patent: Nov. 17, 2015

(54) PERIPHERAL UNIT ADAPTED TO VARIABLY SIZED HANDHELD HOST DEVICES

(71) Applicant: KHYBER TECHNOLOGIES CORPORATION, Sharon City, OH (US)

(72) Inventor: Rajendra Kumar, Belmont, CA (US)

(73) Assignee: Khyber Technologies Corporation, Akron, OH (US)

( * ) Notice: Subject to any disclaimer, the term of this patent is extended or adjusted under 35 U.S.C. 154(b) by 0 days.

(21) Appl. No.: 14/301,992

(22) Filed: Jun. 11, 2014

(65) Prior Publication Data

US 2014/0313657 A1 Oct. 23, 2014

Related U.S. Application Data

(63) Continuation of application No. 11/568,342, filed as application No. PCT/IB2005/051479 on May 5, 2005, now Pat. No. 8,783,574.

(60) Provisional application No. 60/568,477, filed on May 5, 2004.

(51) Int. Cl.
*G06K 7/10* (2006.01)
*G06F 1/16* (2006.01)
*H04M 1/725* (2006.01)

(52) U.S. Cl.
CPC ............ *G06F 1/1632* (2013.01); *G06F 1/1615* (2013.01); *G06F 1/1662* (2013.01); *H04M 1/72527* (2013.01); *G06F 1/1626* (2013.01)

(58) Field of Classification Search
CPC ... G06F 1/1632; G06F 1/1662; G06F 1/1615; H04N 2201/0058; F16M 2200/06; B60R 2011/0008; B60R 11/0241; H04M 1/72527

USPC .............. 235/375, 462.01–462.49, 472.01; 455/572.1; 248/160–161, 274.1; 361/679.1

See application file for complete search history.

(56) References Cited

U.S. PATENT DOCUMENTS 4,237,540 A 12/1980 Sato
5,033,709 A * 7/1991 Yuen .............................. 248/313

(Continued)

FOREIGN PATENT DOCUMENTS

AU 4906896 8/1996
DE 33 23 858 A1 3/1985

(Continued)

OTHER PUBLICATIONS

Hewlett Packard of Palo Alto, California, Dual-Slot Card Expansion Pack for iPaq PDA devices, website: http://www.shopping.hp.com/cgi-bin/hpdirect/shopping/scripts/product_detail/product?det . . . , Apr. 26, 2004.

(Continued)

*Primary Examiner* — Laura Gudorf
(74) *Attorney, Agent, or Firm* — Hahn Loeser & Parks LLP

(57) ABSTRACT

A peripheral unit comprises a housing having a portion configured to engage with a handheld host device of various sizes and electrical configurations. An attachment mechanism is associated with the housing, being used to selectively secure the housing to the handheld host device to form a one-piece apparatus suitable for handheld use. The attachment mechanism is secured to the host device by selective adjustment of the size to adapt to a host device. In addition, the peripheral unit may provide a universal connection to at least one electrical connector of the host device, to provide added input-output functions to the operation of the combined system.

8 Claims, 8 Drawing Sheets

(56) References Cited

U.S. PATENT DOCUMENTS

| | | | |
|---|---|---|---|
| 5,057,676 A | 10/1991 | Komaki | |
| 5,241,303 A | 8/1993 | Register et al. | |
| 5,268,816 A | 12/1993 | Abell et al. | |
| 5,276,589 A | 1/1994 | Bartlett et al. | |
| 5,278,779 A | 1/1994 | Conway et al. | |
| 5,349,497 A | 9/1994 | Hanson et al. | |
| 5,383,138 A | 1/1995 | Motoyama et al. | |
| 5,548,477 A | 8/1996 | Kumar et al. | |
| 5,638,257 A | 6/1997 | Kumar et al. | |
| 6,119,179 A * | 9/2000 | Whitridge et al. | 710/72 |
| 6,320,962 B1 * | 11/2001 | Eisenbraun | 379/446 |
| 6,427,959 B1 | 8/2002 | Kalis et al. | |
| 6,657,654 B2 * | 12/2003 | Narayanaswami | 348/14.04 |
| 6,708,887 B1 | 3/2004 | Garrett et al. | |
| 6,837,435 B2 | 1/2005 | Kehoe et al. | |
| 7,028,905 B2 | 4/2006 | Sato et al. | |
| 2002/0009194 A1 | 1/2002 | Wong et al. | |
| 2002/0099895 A1 * | 7/2002 | Landron et al. | 710/303 |
| 2002/0186525 A1 * | 12/2002 | Singh | 361/680 |
| 2003/0006998 A1 | 1/2003 | Kumar | |
| 2003/0173242 A1 | 9/2003 | Fisher, Jr. et al. | |
| 2003/0209604 A1 | 11/2003 | Harrison, Jr. | |
| 2004/0204163 A1 | 10/2004 | Ou | |
| 2006/0105821 A1 * | 5/2006 | Goradesky et al. | 455/575.1 |

FOREIGN PATENT DOCUMENTS

| | | |
|---|---|---|
| EP | 0827605 | 3/1998 |
| WO | 9623251 | 8/1996 |

OTHER PUBLICATIONS

Socket Communications of Newark, California, CF card based peripherals such as In-Hand Scan Card, website: http://www.socketcom.com/product/bar.asp, Apr. 27, 2004.

Arkon Resource Inc. of Arcadia, California, Cable-connected peripheral units such as Digital Wireless Stereo Music Adapter model SF250, website: http://www.arkon.com/sf.html, Apr. 27, 2004.

Seidio Inc. of Houston, Texas, Universal Mount Kit for PDA devices, website: www.seidio.com or www.seidio-europe.com, Oct. 24, 2003.

Alien Technologies of Morgan Hill, California, OEM module model ALR-9930, website: http://www.alientechnology.com/02_products_p02s3.html, Apr. 26, 2004.

IBM Technical Disclosure Bulletin, Multiple Human Interfaces for a Common Central Electronic Complex, vol. 36, No. 9A, Sep. 1, 1993, p. 3/4 XP000395121.

Patent Abstracts of Japan, vol. 018, No. 460 (P-1793), Aug. 26, 1994 & JP 06 149412 A (Brother Ind Ltd), May 27, 1994.

Editor Opinion, Pen Computing Magazine, vol. 1, No. 1, pp. 5-6 (Aug. 1994).

"Pen Based Buyer's Guide", Pen Computing Magazine, vol. 1, No. 1, pp. 86-89 (Aug. 1994).

"PDA Buyer's Guide", Pen Computing Magazine, vol. 1, No. 1, pp. 83 & 84 (Aug. 1994).

Advertisement for EHT-30 Handheld Computer, Seiko Epson Corporation (Oct. 1993).

Advertisement for IBM Think Pad 750 Family Notebook Computers (Sep. 1993).

* cited by examiner

PERIPHERAL UNIT ADAPTED TO VARIABLY SIZED HANDHELD HOST DEVICES

CROSS-REFERENCE TO RELATED APPLICATIONS

This application is a continuation of U.S. application Ser. No. 11/568,342 filed on Oct. 26, 2006, which is a U.S. national stage of PCT International Application No. PCT/IB2005/051479 filed on May 5, 2005, which claimed priority to U.S. Provisional Ser. No. 60/568,477, filed May 5, 2004, all of which are incorporated herein by reference.

BACKGROUND

This relates to devices and systems to provide added functionality to off-the-shelf handheld computing devices or host devices.

There are a number of commercially available products that provide computing functionality in a handheld device, which may be termed a "host device." Such host devices may include examples such as portable digital assistance (PDA) cell phones and smart phones, as well as various other handheld computing devices, which may or may not have wireless communication capabilities. Although such devices perform a variety of computing and other tasks, they are generally limited in terms of functionality, and it would be desirable to provide additional functionality in conjunction therewith, using the computing power of the host device in performing other functions in a selective fashion. For example, it would be desirable to provide the ability to add peripheral functions such as bar code scanning, radio frequency identification (RFID) reading, key-entry, wireless communications, telecommunications, and network communications as examples.

It is also noted that in commercially available host devices of this type, the form-factor of the devices varies significantly from one device to the next. Differing form-factors for the handheld devices makes it difficult to adapt a peripheral device to a variety of variably sized or configured handheld host devices. As such, peripheral systems are generally customized or configured specifically for a particular handheld computing device. In addition to variable size and form-factor of such devices, the configuration of the devices is also variable, such as with respect to electrical or communication connectors associated therewith. Although devices within a group of host devices generally have standard electrical connectors, such as Compact Flash (CF) socket and USB connector, the relative positions of such connections generally vary from one device to the next. Again, such variation generally requires any peripheral devices to be specifically constructed for mating with a particular host device.

Thus, in order to cope with the variations in the form-factor described above from one host device to the next, peripheral units are tailored to a specific host device, being customized for use with the specific host device. Examples of some currently available solutions are (a) custom-fitted peripheral units such as a Dual-Slot Card Expansion Pack for iPaq PDA devices, both offered by Hewlett Packard® of Palo Alto, Calif., and U.S. Pat. No. 5,349,497 of Hanson et. al.; (b) CF card based peripherals such as In-Hand Scan Card from Socket Communications of Newark, Calif.; (c) cable-connected peripheral units such as Digital Wireless Stereo Music Adapter model SF250 from Akron Resource Inc. of Arcadia, Calif.; (d) Universal Mount Kit for PDA devices offered by Seidio Inc. of Houston, Tex.

As will be evident from a review of known attempts at providing peripheral functions in association with such host devices, the custom-fitted solutions have drawbacks, in that such systems must be constantly reengineered as new models of host devices are introduced into the market. This delays market introduction of such peripherals, and adds to the cost thereof. Further, with CF card peripherals, for example, such systems have an oversized module portion, which are prone to damage when impacted due to a fall or bumping into external objects during use. Alternatively, if the peripheral unit is connected by a loose-cable connection such connections are cumbersome for handheld use, because they eliminate the one-piece configuration of the handheld host device. Attempts at providing side grips employed in universal cradle mounts are also bulky and fail to provide means of holding a host device in a secure manner for use in handheld operations.

Based upon the foregoing, it would be desirable to provide a peripheral unit, which can adapt to variably sized and configured handheld host devices, to be selectively combined with a host device to result in a one-piece, handheld configuration. It would also be desirable to provide a peripheral unit, which can provide added protection to a host device combined therewith, against mechanical shock or other external forces to which the combined system may be subjected. It would be a further advantage to provide a peripheral unit which can add highly desirable input/output functions, such as bar code scanning, RFID reading, key-entry, wireless communications, telecommunications, and/or network communications, for examples.

SUMMARY

The following provides a peripheral system and methods which overcome the limitations of the prior art, and provide the distinct advantages desired above as well as other objectives and advantages.

Systems and methods may provide added protection to the host device against mechanical shock, and/or may add peripheral functions to the host device when combined therewith.

Certain embodiments provide a portable peripheral unit to provide additional electronic functionality when combined with an off-the-shelf host device comprising: a housing configured to engage with a plurality of different-sized handheld host devices; an attachment mechanism that secures a handheld host device from the plurality of different-sized handheld host devices to the housing; a set of arms of the attachment mechanism that secure the handheld host device on at least two different edges of the handheld host device; at least one adjustment mechanism of the attachment mechanism that includes at least one threaded element selectively engaged with at least one threaded fastener to adjust the set of arms; wherein the at least one adjustment mechanism adapted to move at least one arm of the set of arms with respect to another arm of the set of arms, for adjustment of a space therebetween in which the handheld host device is secured.

Certain aspects are directed to a combination of a portable electronic host device and a portable peripheral unit for attachment to the portable electronic host device, the combination comprising: the portable electronic host device having a first set of electronic circuits providing a first set of electronically-accomplished functions; the portable peripheral unit having a second set of electronic circuits for completing a second set of electronically-accomplished functions; a housing of the portable peripheral unit configured to receive a plurality of host devices having different heights, widths, and thicknesses, the portable electronic host device is one among the plurality of host devices; a communication circuit communicatively coupling the first set of electronic circuits and the second set of electronic circuits; an attachment mechanism for retaining the portable electronic host device within the housing including a set of arms configured to secure the portable electronic host device; and at least one adjustment mechanism for varying the attachment mechanism to accept any of the plurality of host devices having at least one of varying length, width, and height, wherein the first set of electronically-accomplished functions includes at least one first function not within the second set of electronically-accomplished functions, and wherein the second set of electronically-accomplished functions includes at least one second function not within the first set of electronically-accomplished functions.

In a further aspect, an embodiment can include a portable peripheral unit, comprising: a housing shaped and sized to mate with off-the-shelf handheld host devices to form a one-piece integrated handheld system; an electronic circuit within the housing configured to complete a task; a communication circuit adapted to communicate with both the electronic circuit and a host device when the host device is mounted in the housing; an attachment mechanism associated with the housing, being used to secure the housing to the host device, wherein the attachment mechanism is secured to the host device by selective adjustment to adapt to a variable dimension of the host device; and at least one peripheral component, the at least one peripheral component includes at least one of a user input component, a user output component, network connection component, a wireless network connection component, and a global positioning system receiver.

These and other objects and advantages will become apparent upon a further reading of the Detailed Description in conjunction with the drawings.

BRIEF DESCRIPTION OF THE DRAWINGS

A first preferred embodiment is illustrated in FIGS. 1 through 4. A second preferred embodiment is illustrated in FIG. 5 and the third embodiment is illustrated in FIGS. 6A and 6B.

DETAILED DESCRIPTION

Figure 1:
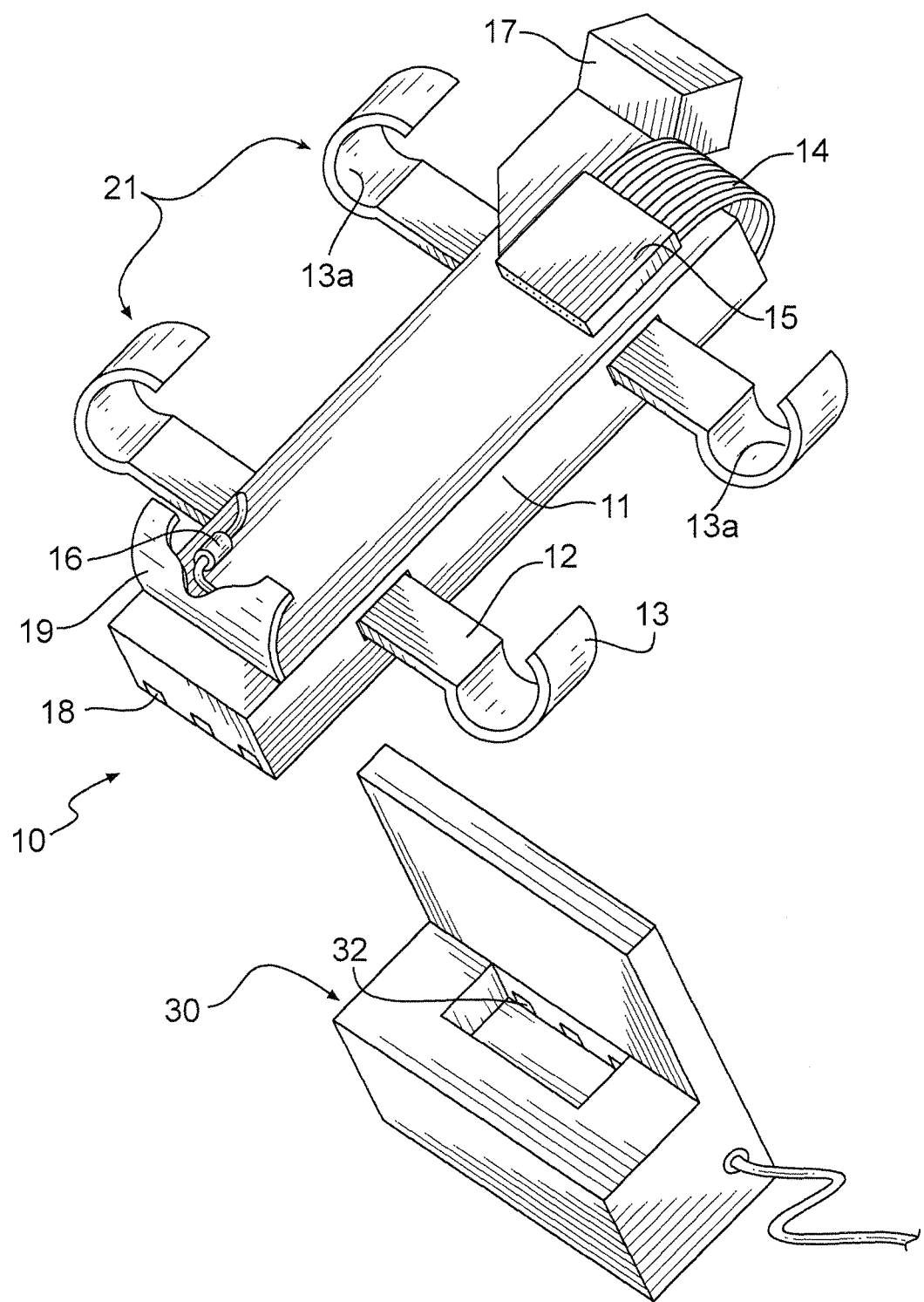
FIG. 1 is a top perspective view of an exemplary device showing both a peripheral unit and a charging cradle.

Turning now to FIG. 1, there is shown a perspective view of an exemplary device, wherein the capabilities and functions can be understood. In this embodiment, the peripheral unit 10 has a housing or main body portion 11, and an attachment system or mechanism 21. The housing 11 may be configured to be thin and have a long axis, which will make it suitable for engagement with variably sized and configured handheld host computing devices. Such host devices may include PDA's, smart phones, cell phones or any other handheld computing device. The housing 11 is shaped and sized to mate with such variably sized handheld host devices in an unobtrusive manner, due to the small size and slim configuration thereof. At the same time, the housing 11 provides support for added functionalities, as will be hereinafter described with reference to various embodiments. There are electrical or other connections provided in association with the housing 11. In the configuration as shown, the peripheral unit 10 may be used to add a bar code scanning functionality to a handheld host device, such as a laser bar code scanner, having scanner housing portion 17. A ribbon cable 14 may be interchangeably used to connect the scanner via a CF card 15 provided at a top portion of housing 11. In this configuration, the CF card 15 is easily connected to a connection port on the host device, provided at a top portion thereof. Other connecting cables may be used for other standard connection ports. The housing 11 may also be configured to have charging contacts 18 positioned to be selectively connected to matching contacts 32 associated with a charge cradle 30, as an example. The peripheral unit, whether engaged with a host device or not, may be seated in the charge cradle 30 for charging of a peripheral power source provided in housing 11. Such a power source may then operate added functions such as the bar code scanning system, but may also be used for charging of a battery supply associated with the host device. In this regard, an interchangeable DC jack 16 may be provided for selective connection to the host device. For full functionality, the DC jack 16 may be selectively changed, so a suitable connector for any particular host device may be used.

Figure 2:
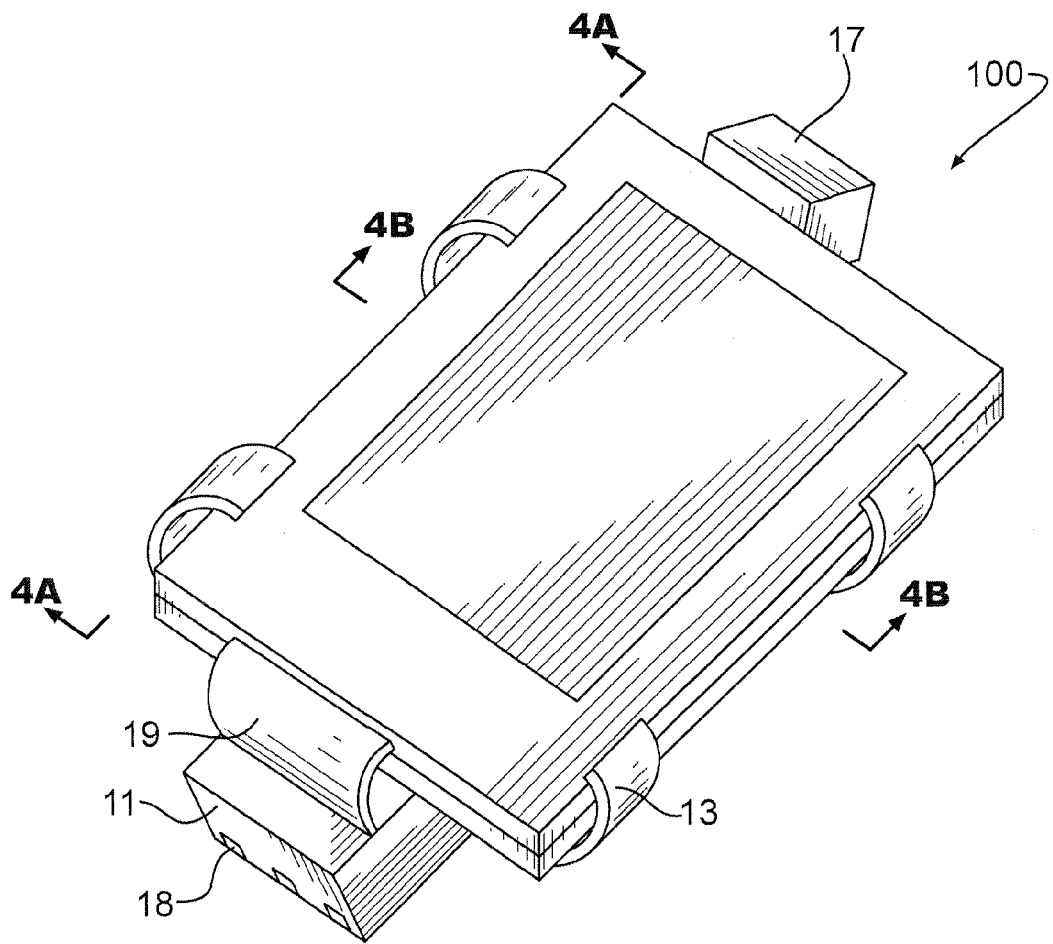
FIG. 2 is a top perspective view an assembly of the exemplary device shown mounted on the backside of an off-the-shelf host device.
Figure 3:
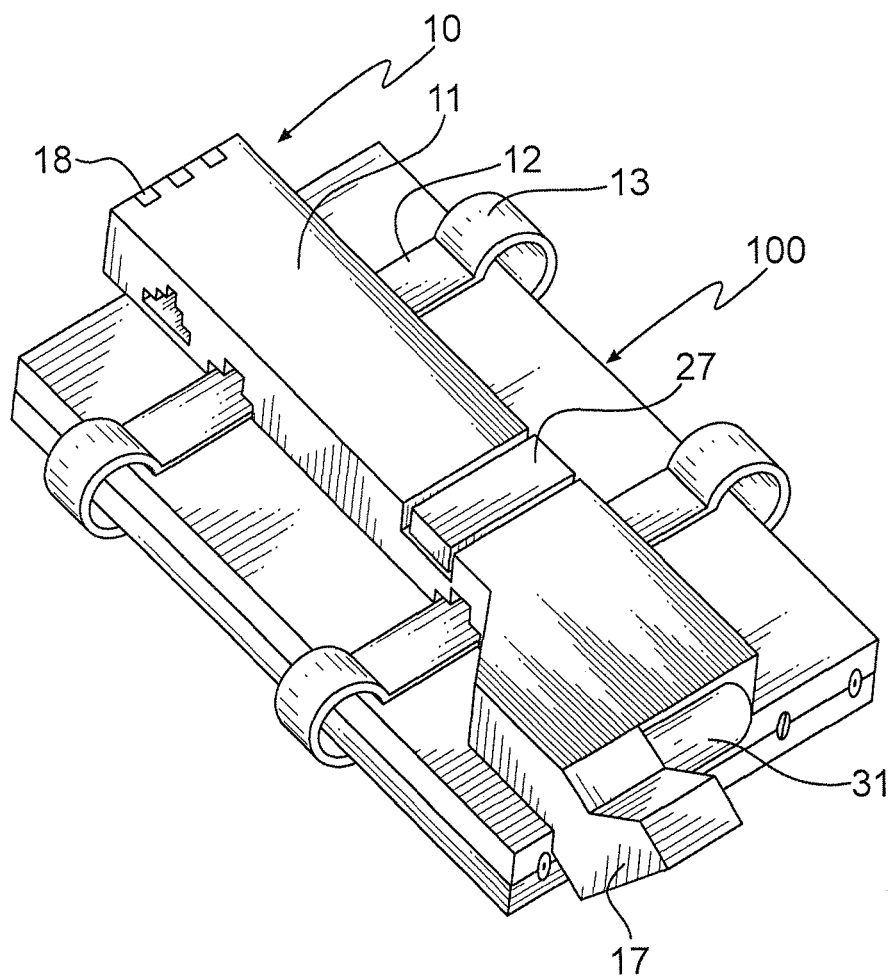
FIG. 3 is a bottom view of the assembly shown in FIG. 2.

As seen in FIGS. 2 and 3, the peripheral unit 10 may be selectively engaged to a host device 100. The unit 10 is securely engaged to the host device 100 by means of the attachment mechanism 21, to form a one-piece apparatus suitable for handheld use. The attachment mechanism 21 is selectively secured to the host device 100 by selective adjustment of the size thereof to adapt to any particular host device 100 with which it may be used. In this embodiment, the attachment mechanism 21 comprises at least two attachment arms 12 provided on opposing sides of housing 11. The extent of the arms 12 extending away from housing 11 is selectively adjustable, with a maximum extent accommodating the variable sizes of handheld host computing devices 100 as described. In the embodiment shown, multiple attachment arms 12 are provided, such as adjacent to the top and bottom portions of housing 11, and each of the arms 12 terminates with a coupling hook member 13. In this embodiment, the hook members 13 are shaped to securely engage the side edges of any variably sized or configured handheld host device 100, by means of the arcuate engaging surfaces 13a associated therewith. The arcuate engaging surfaces 13a are sized to extend around the variable thickness edges of various host devices 100. The arcuate configuration of surfaces 13a will then engage the front and back corners of the side edges of host device 100 for positive securement to the host device 100, regardless of its particular size or shape.

Figure 4A:
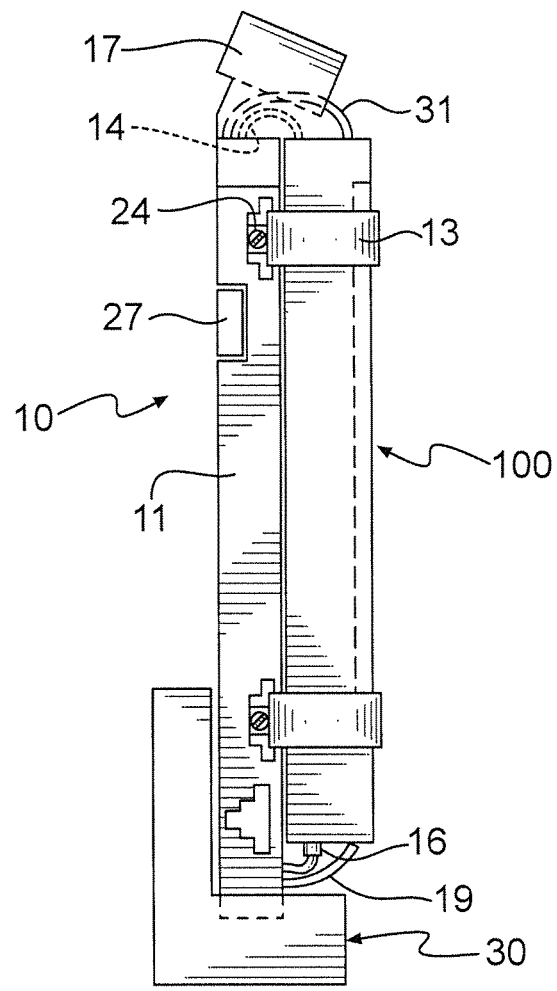
FIG. 4A is a left side view of the assembly shown in FIG. 2.
Figure 4B:
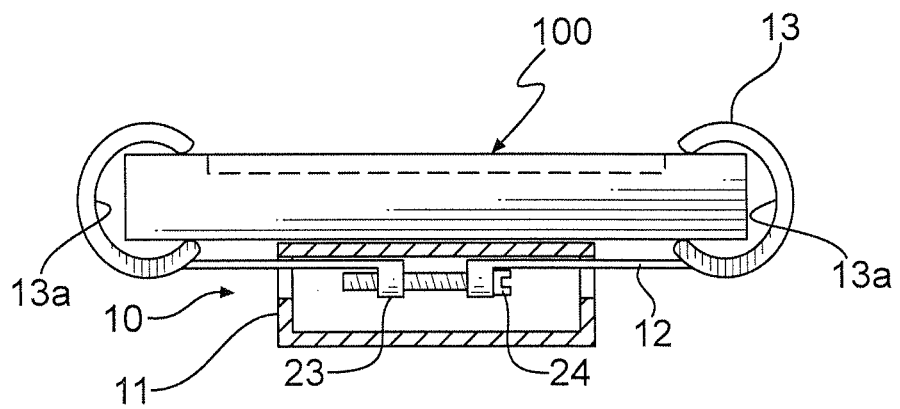
FIG. 4B is a cross-sectional view of the assembly shown in FIG. 2.

As seen in FIGS. 4a and 4b, the handheld host device 100 may have the peripheral unit engaged on a back portion thereof, with the low profile housing 11 not adding significantly to the housing configuration of the handheld host device 100. When unit 10 is engaged with host device 100, the integral one-piece system produced thereby provides an easily used handheld configuration, wherein any functions of the host device 100 may be accessed or performed, and any added functionality provided by unit 10 may also be accessed or used. The added functionalities of unit 10 are also integrated in association with host device 100, with computing and processing capabilities provided by the host device processor and/or a separate processor provided in unit 10. As shown in this embodiment, the DC jack 16 may be selectively coupled to the host device 100 to supply power thereto from a battery supply provided in unit 10. The ribbon cable 14 is selectively coupled to the host device 100, to selectively couple the scanner provided in housing portion 17 for operation in conjunction with host computing device 100. In this embodiment, to add the functionality of laser bar code scanning, a trigger 27 may be provided in association with housing 11 for selective actuation of the scanner associated therewith. The full integration of peripheral systems associated with unit 10 in conjunction with host device 100 provides a fully functional one-piece system for handheld use as desired.

In this embodiment, the arms 12 may be adjustably supported in conjunction with housing 11, to accommodate variably sized host devices 100. Any suitable adjustment mechanism may be used, and the example shown in this embodiment is merely a possible design choice thereof. Other suitable arrangements would occur to those skilled in the art. As shown in this embodiment, each of the arms 12 may have a supporting elements 23 having a threaded aperture to which a screw 24 or the like may be selectively engaged. As should be recognized, upon rotation of screw 24, the arms 12 will adjust relative to one another, to accommodate any variably sized host device 100.

In conjunction with various functionalities that may be provided with unit 10, the housing 11 and attachment mechanism 21 also provide resistance against shock impact on host device 100 if the integrated assembly is dropped or bumped into an external object. The side edges, as well as back surface of the host device 100 are protected by the host device 100 and associated attachment mechanism. In addition, the unit 10 may be provided with additional protective features, such as a cable cover 19 provided for covering connection of DC cable, and/or a ribbon cable cover 31 for protecting the connection of CF card 15 to host device 100 as an example. The cable covers 19 and 31 protect the connections from getting bumped or otherwise damaged and also prevent the cables from becoming tangled into other objects during use.

In this embodiment, it should be noted in FIG. 4B that the main body portion 11 can be positioned laterally by sliding along the arms 12 until the CF card 15 is aligned with a corresponding CF socket on the handheld host device 100. The main body portion can be fixed in that position by screwing in the bolt 24 into the threaded supporting element 23 until the arms 12 and the hook members 13 are pulled in tight, thereby securing the peripheral unit 10 to the off-the-shelf handheld host device 100. Similarly, the position of the main body portion 11 can be adjusted longitudinally along the length of the handheld host device 100 until a desired engagement is obtained. For example, in the correct position of the peripheral unit 10, there should be no undesired interference between external components of the handheld host device 100 and the external components of the peripheral unit 10 such as the arms 12, the hook members 13, the scanner housing portion 17, the charge cable cover 19, and ribbon-cable cover 31.

Figure 5:
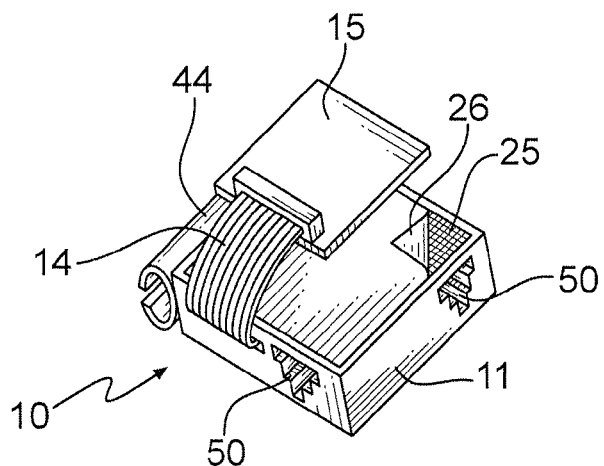
FIG. 5 is a top perspective view of the second embodiment of an exemplary device, having an adhesive-coated portion.

Turning to FIG. 5, an alternative embodiment is shown. In this embodiment, a low profile housing 11 may have an adhesive coated portion 25 for selective engagement to a host device 100. The adhesive coated portion 25 may be initially covered with a user-removable coversheet 26, for selective attachment to any portion of a host device 100 after removal thereof. Alternatively, a hook and loop fastening system may be used, with a portion provided on housing 11 and a portion on the host device 100. A ribbon cable 14 having a CF card or other suitable connection may be provided similarly to the embodiment as shown previously. A holster 41 may be provided for use as a wand holder or other suitable holder for a scanning device as an example. Multiple inlet/outlet or communication ports may be provided in association with housing 11 for selective coupling to a handheld host device 100. Thus, added functions provided in association with unit 10 are combined with the host device 100 while forming a one-piece integrated system for handheld use.

Figure 6A:
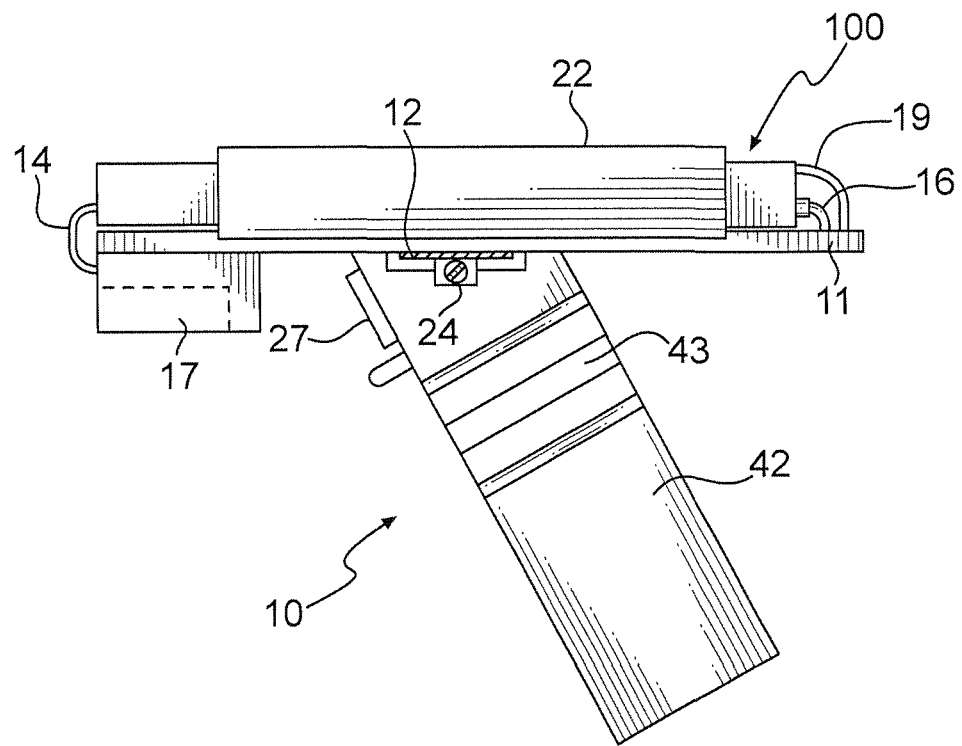
FIGS. 6A and 6B are side views of the third embodiment of an exemplary device, having a handle.
Figure 6B:
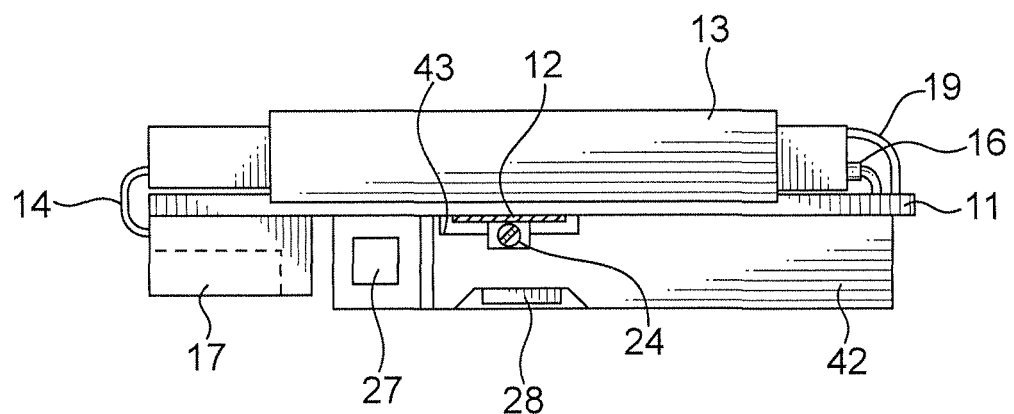

FIGS. 6A and 6B show the third embodiment, whereby the peripheral unit 10 also includes a handle 42, which can be attached to the main body portion 11 in multiple positions, including a position pointing away from the main body portion 11 as shown in FIG. 6A, and a position pointing along the main body portion as shown in FIG. 6B. In this embodiment, the main body portion 11 is securely attached to an off-the-shelf handheld host device 100 via a pair of flanges 22. The scanner housing portion 17 is positioned completely under the handheld host device 100. Alternatively, the scanner housing portion 17 can be positioned along the main body portion as shown in the first embodiment in FIGS. 1 through 4. In other respects, this embodiment may operate in ways similar to that in earlier embodiments described above.

Alternatively, in this embodiment, an RFID reader may be provided in association with the peripheral unit 10. This can be achieved by providing interconnections as described in FIG. 8 for a RFID reader 173, a peripheral unit processor 119, auxiliary battery 117, and power supply circuit 116. For example, a suitable RFID reader is available as an OEM module model ALR-9930 from Alien Technologies of Morgan Hill, Calif. The RFID reader can be packaged into the handle 42 along with the said auxiliary battery and the said power supply circuit. The said peripheral unit processor and the RFID antenna can be packaged in the main body portion 11.

Figure 7B:
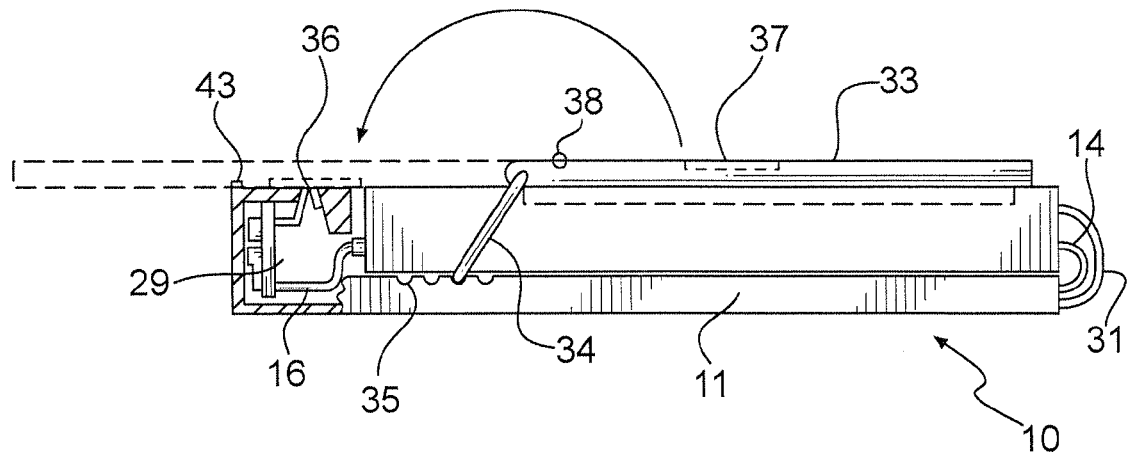
FIGS. 7A and 7B are top perspective view and right side view of the fourth embodiment of an exemplary device, having a keyboard that also serves as a lid over the display screen of the handheld host device.
Figure 7A:
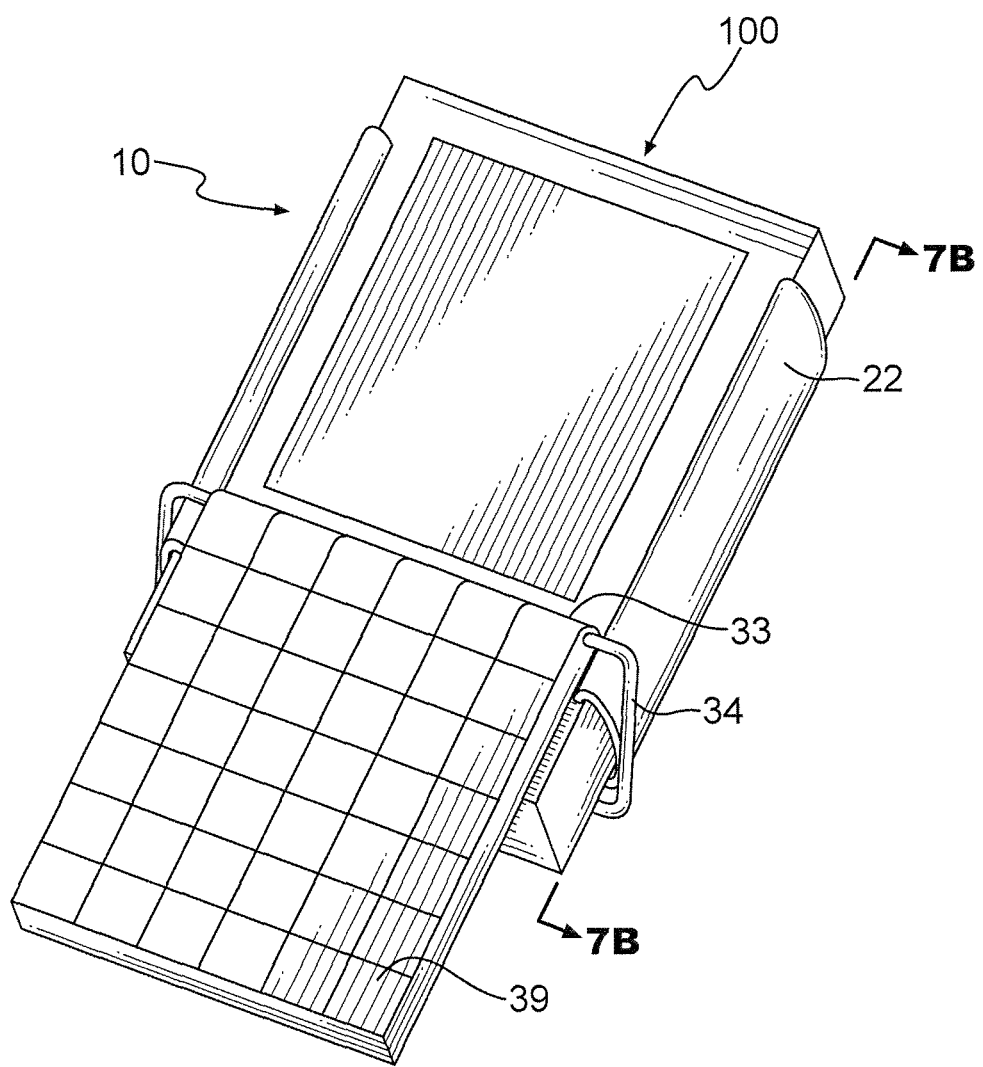

A further embodiment is shown in FIGS. 7a and 7b, wherein the peripheral unit 10 provides additional functionalities. In this embodiment, the peripheral unit 10 includes a keyboard module 33, which is selectively coupled in a low profile adjustable manner to the host device 100. In this embodiment, as an example, the keyboard module 33 is hingedly connected to the host device 100 by means of a pair of hinge-arms 34. The hinge-arms 34 are selectively retained by the housing or main body portion 11 of unit 10, such as shown in FIG. 7b. To further facilitate functionality, the housing 11 may include multiple notches 35 or the like, where the hinge-arms 34 are selectively retained, thereby positioning the keyboard module 33 in a desired position relative to the front surface of the host device 100. As an example, the user may selectively position the keyboard module 33 to substantially cover the display screen of the off-the-shelf handheld host device 100 of various sizes. For use, the keyboard module 33 may be flipped or moved between an open position as shown in FIG. 7a, and a closed position as shown in FIG. 7b, where the display of the host device 100 is protected. The keyboard module 33 may be provided with a keypad 39 on a side thereof, and keyboard contacts 37 for selective connection to a keyboard connector 36 provided in unit 10. As an example, the configuration may allow suitable connection between the keyboard contacts 37 and keyboard connector 36 when the keyboard module 33 is in the open position. To further facilitate functionality, the keyboard module 33 may be held in position when in the open position, with the assistance of frictional force between a keyboard groove 38 and one of a set of keyboard retention ridges 43 carried on a surface of the end portion 29 of housing 11. It should be noted that for proper operation of the keyboard module 33, the mechanical arrangement of the keyboard retention ridges 43 will be a duplicate of the arrangement of the notches 35. This technique will ensure that there will be a properly positioned keyboard retention ridge 43 to mate with the keyboard retention groove 38, regardless of which notch 35 is used to assemble the peripheral unit 10 in association with the handheld host device 100. Other suitable adjustment mechanisms to allow selective positioning of keyboard module 33 would also occur to those skilled in the art and are contemplated. Also as shown in this embodiment, a pair of flanges 22, having an arcuate engaging portion may be used for selective engagement of the housing 11 in association with the host device 100.

In another embodiment of an exemplary device, a different scheme of providing the keyboard capability can be used. For example, a technique described in detail in U.S. Pat. No. 5,638,257, can be used instead of the keyboard method described above, and this patent is hereby incorporated herein in its entirety by reference. In the case of the employment of the '257 patent, the keyboard module will go through a planar motion between the open and closed positions instead of flipping over as described above for the fourth embodiment.

Figure 8:
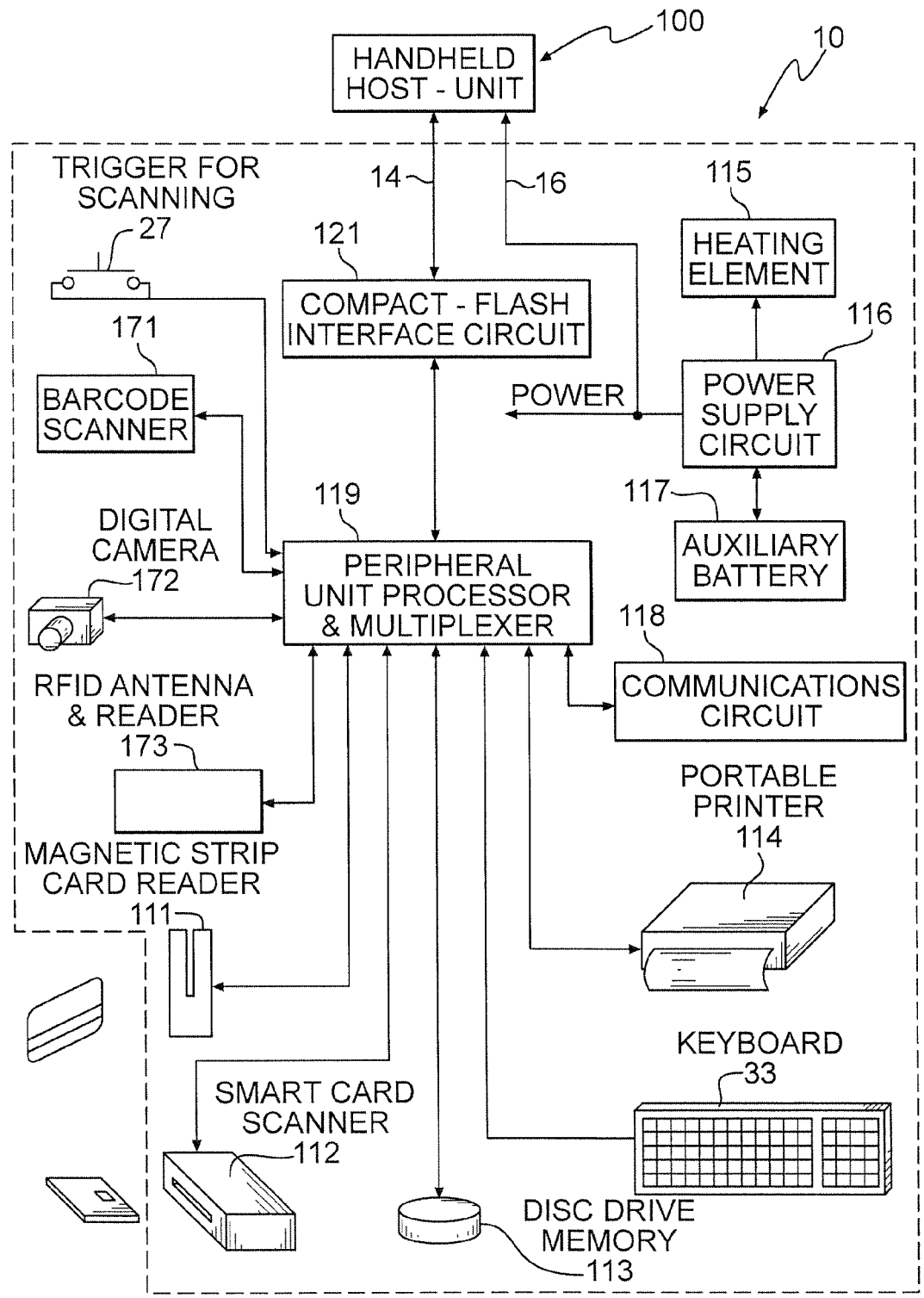
FIG. 8 is a block diagram representation of an embodiment of an exemplary device.

In FIG. 8, various aspects and functions which may be implemented in the peripheral unit 10 are described. As shown in the block diagram of FIG. 8, a peripheral unit 10 may have one or more functionalities provided in association with peripheral unit, to be integrated and used in a combined fashion with those capabilities and functions of a handheld host device 100.

The handheld host device 100 is shown to be interconnected to the peripheral unit 10 via various suitable connections, such as a ribbon cable 14 and compact flash (CF) interface circuit 121 as shown. Other suitable connections compatible with those standard connections associated with the handheld host device 100 are contemplated. These connections are, in turn, connected to a peripheral unit processor 119 and multiplexer as an example. The peripheral unit processor 119 and multiplexer may, in turn, be connected to a variety of peripheral devices for adding functionality to the combined system with handheld host device 100. As examples, the peripheral unit may include systems and functions selected from the group of scanning systems, such as a bar code scanner 171, or the like, a digital camera 172, RFID reader 173 with antenna, magnetic strip card reader 111, smart card reader 112, disk drive memory 113, portable printer 114, communication circuit 118, and/or keyboard module 33. If a scanning device is provided, a trigger 27 or like actuator may be provided. These are only examples of possible peripheral devices, which may be combined with peripheral unit 10 to add functionality to the handheld host device 100. The peripheral unit 10 may also include an auxiliary battery 117, regulated by a power supply circuit 116, which may supply power to the components of the peripheral unit 10, and can also serve as backup power for the handheld host device 100 by means of the DC jack 16 as previously described. Other desired functionalities may also be incorporated into peripheral unit 10, such as a heating element 115, enabling the use of the combined system with unit 10 and the host device 100 in extremely cold environments. Alternatively, other arrangements may be used for enhancing use in other environments.

All of these or other functional components which may be integrated into the unit 10 are readily available in the marketplace, and those skilled in the art should understand these and other types of devices and functions. Such embedded components will be integrated into unit 10 instead of being externally connected to a host device 100. Further, one or more of these components may be implemented, and although shown as having electrical connection to the peripheral unit processor 119 and multiplexer, wireless connection is also contemplated. Thus, for example, the keyboard module 33 may be wirelessly coupled for operation in association with host device 100. Thus, the peripheral unit 10 may be tailored for an application, where only one or more of the functional components may be used, such as for bar code scanning, or to include a smart card reader 112 and/or magnetic strip card reader 111, depending upon the application for use. All these variations are contemplated.

Although the above has been described in detail, the same is by way of illustration and example only and is not be taken as a limitation. Accordingly, the scope and content are to be defined only by the terms of the appended claims.

What is claimed is:

1. A portable peripheral unit to provide additional electronic functionality when combined with an off-the-shelf host device comprising:
   a housing configured to engage with a plurality of different-sized handheld host devices;
   an attachment mechanism that secures a handheld host device from the plurality of different-sized handheld host devices to the housing;
   a set of arms of the attachment mechanism that secure the handheld host device on at least two different edges of the handheld host device, each arm of the set having a supporting element having an aperture, at least one of the apertures being a threaded aperture;
   at least one adjustment mechanism of the attachment mechanism that includes a threaded fastener selectively engaged with the supporting elements to adjust the set of arms;
   wherein the at least one adjustment mechanism is adapted to move at least one arm of the set of arms with respect to another arm of the set of arms, for adjustment of a space therebetween in which the handheld host device is secured.

2. A portable peripheral unit according to claim 1, wherein the threaded fastener is a screw.

3. A portable peripheral unit according to claim 1, wherein an end of each arm is adapted to engage a portion of the handheld host device.

4. A portable peripheral unit according to claim 1, wherein the attachment mechanism includes a loop, and wherein the at least one adjustment mechanism couples at least two portions of the loop.

5. A portable peripheral unit according to claim 1, wherein the portable peripheral unit further comprises a keyboard module.

6. A portable peripheral unit according to claim 5, wherein the keyboard module is repositionable in relation to the housing.

7. A portable peripheral unit according to claim 5, wherein the keyboard position is variable along at least one of a length and a width of the portable peripheral unit based on dimensions of the handheld host device.

8. A portable peripheral unit according to claim 1, wherein the housing and attachment mechanism mechanically shield a significant portion of the handheld host device when the housing is engaged therewith.

* * * * *